(12) United States Patent
Alexander

(10) Patent No.: US 7,815,411 B2
(45) Date of Patent: Oct. 19, 2010

(54) MULTIPLE FUNCTION LANDSCAPING SYSTEM AND METHOD

(76) Inventor: Larry Alexander, 8750 Pendleton Pike, Indianapolis, IN (US) 46226

( * ) Notice: Subject to any disclaimer, the term of this patent is extended or adjusted under 35 U.S.C. 154(b) by 601 days.

(21) Appl. No.: 11/801,888

(22) Filed: May 11, 2007

(65) Prior Publication Data

US 2008/0279663 A1    Nov. 13, 2008

(51) Int. Cl.
*B65F 3/26*    (2006.01)
(52) U.S. Cl. ........................ 414/494; 414/809
(58) Field of Classification Search .............. None
See application file for complete search history.

(56) References Cited

U.S. PATENT DOCUMENTS 5,232,329 A * 8/1993 Livingston .................. 414/494

* cited by examiner

*Primary Examiner*—Saúl J Rodriguez
*Assistant Examiner*—Willie Berry
(74) *Attorney, Agent, or Firm*—Daniel J. O'Connor

(57) ABSTRACT

A multiple function landscaping method and system is capable of operating with or without a dump box. A lower lift, crane or hoist can be utilized by itself or in combination with an upper positioned dump box. The novel usage of a single truck bed to achieve such functions as tree delivery, debris removal and top soil delivery enables landscaping to be more efficiently and economically performed, thus providing a significant advantage to the environment.

1 Claim, 7 Drawing Sheets

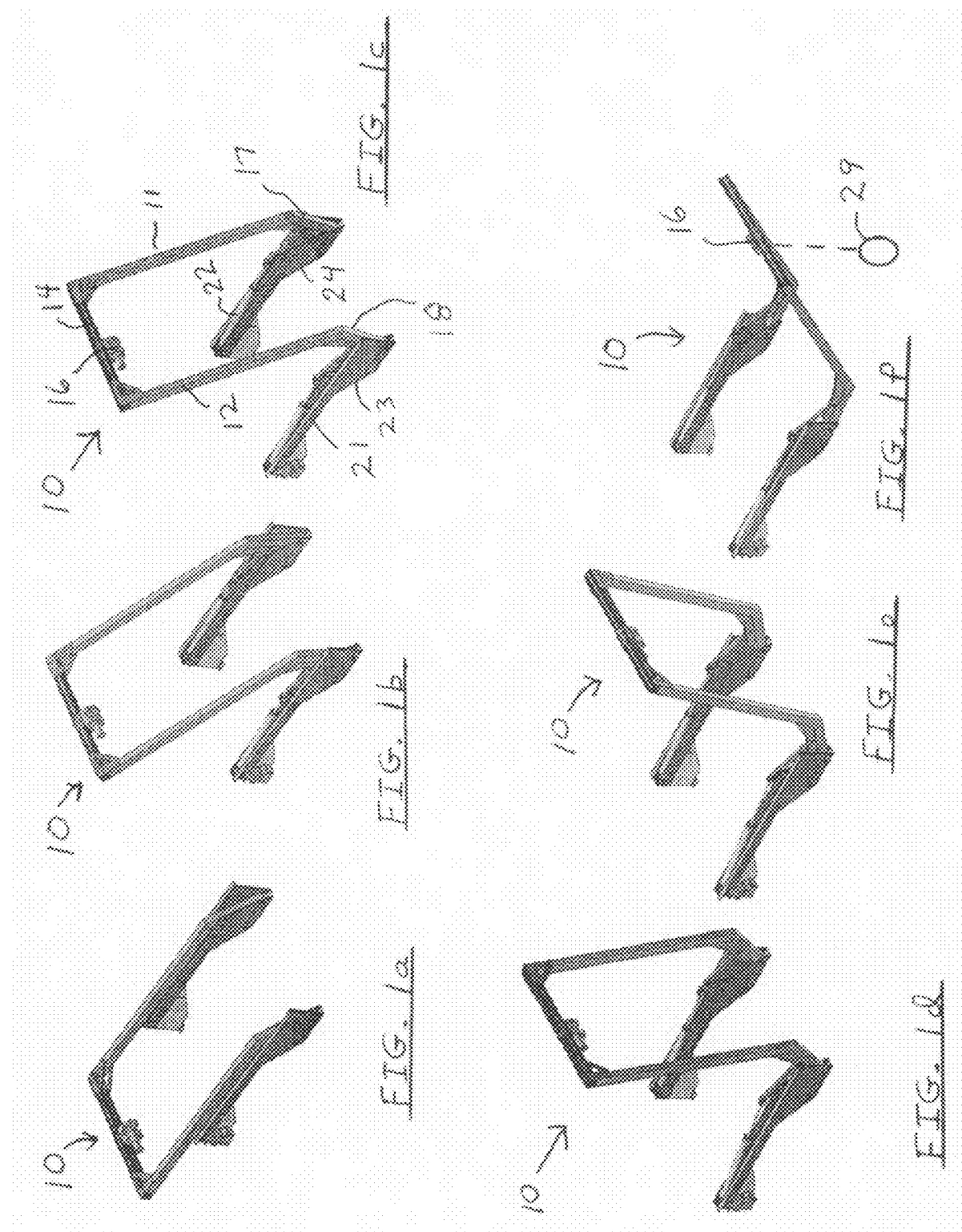

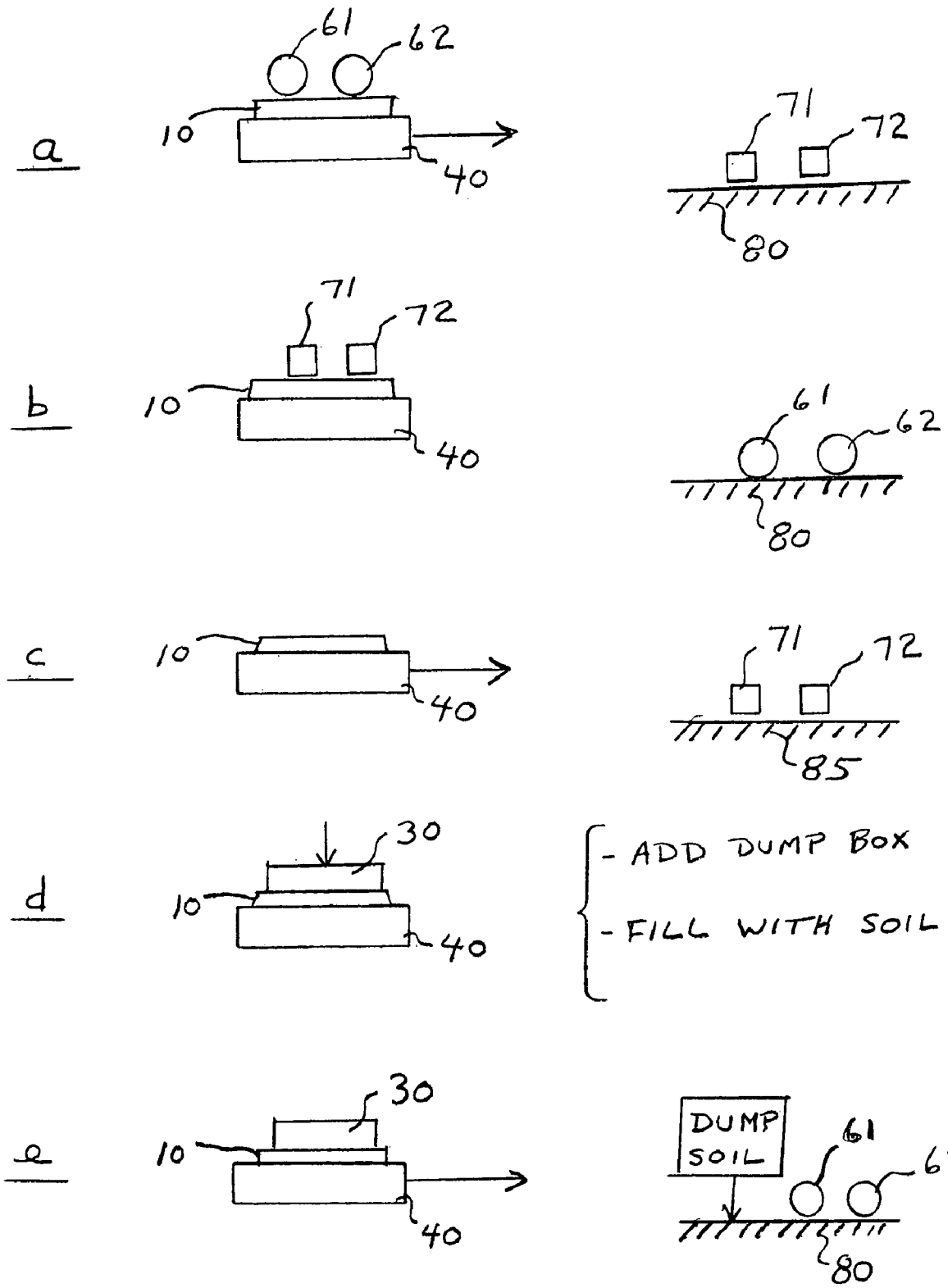

MULTIPLE FUNCTION LANDSCAPING SYSTEM AND METHOD

BACKGROUND AND OBJECTS OF THE INVENTION

The present invention is generally related to the landscaping arts and, in particular, to a landscaping system and method wherein a single truck is utilized to perform multiple landscaping functions.

Landscaping functions which typically require a truck usage include the following:
 moving sand, top soil, mulch and stones;
 new tree or shrubbery transport and unloading;
 tree stump or parts of downed trees loading and transport to a remote location.

As is known in the art, the above functions typically require differing types of trucks, thus requiring multiple vehicles for the landscaping and related personnel.

Such increases the landscaping costs for the operator and consequently raises costs for a land owner desiring to plant trees and other types of vegetation which are beneficial to the environment.

Accordingly, it is an object of the present invention to demonstrate a landscaping truck system which includes a hoist, crane or lift element and further includes a dump truck type of box for dumping materials as needed.

It is a further object to set forth a multiple function landscaping system and method of use which may be readily converted to different uses by a single landscaping person.

It is a still further object to show a landscaping system which reduces operating costs by requiring fewer vehicles. Thus, more planting and debris removal can be achieved as a significant benefit to the environment.

It is also an object to teach a method of use which may be employed by equipment rental companies so an individual can rent useful landscaping devices.

These and other objects and advantages of the invention will be apparent to those of skill in the art from the description which follows.

PRIOR ART PATENTS AND DESIGNS

During the course of preparing this specification for submission to the United States Patent and Trademark Office, a full search of the prior art was conducted.

U.S. Pat. No. 6,354,788 issued to Adams in 2002 teaches a system which doubles as a dump truck and hauler for landscaping. The method includes ramp and deck elements.

U.S. Pat. No. 6,904,979 issued to Confoey in 2005 shows a towable earth working apparatus behind a pickup truck to spread dirt, sand or gravel.

The design described herein, by reason of its dual use of an out-of-the way hoist or lift system in combination with a removable dump box, is submitted to be clearly patentable over all known designs, methods and systems in the prior art. The multiple landscaping functions referred to are performed in a novel manner.

SUMMARY OF THE INVENTION

A landscaping method and system uses multiple elements to accomplish multiple tasks such as tree unloading and top soil transportation.

A dump box and a lift, hoist or crane unit are combined with a truck bed.

The lift or hoist is placed in a lower position and mounted in lateral portions of the truck and truck bed. An upper pivoting portion of the lift or hoist is utilized to transport and unload new trees and/or shrubbery and also to remove debris from an area to be landscaped.

A dump box is removably attached to the upper pivoting section of the lift or hoist and, when in use to deliver top soil etc., the dump box is driven to a dumping position by the upper pivoting section.

Multiple landscaping operations are thus efficiently and economically achievable by a single operator without incurring the costs of multiple vehicles.

BRIEF DESCRIPTION OF THE DRAWING FIGURES

FIGS. 1a through 1e show a lift, hoist or crane used in the invention in various operating positions.

FIG. 7 shows an example of typical method steps used in a landscaping process. The efficient use of a lift with or without a dump box allows many different functions to be performed by a single truck and landscaping person.

FULL DESCRIPTION OF THE PREFERRED EMBODIMENTS

Figure 2A:
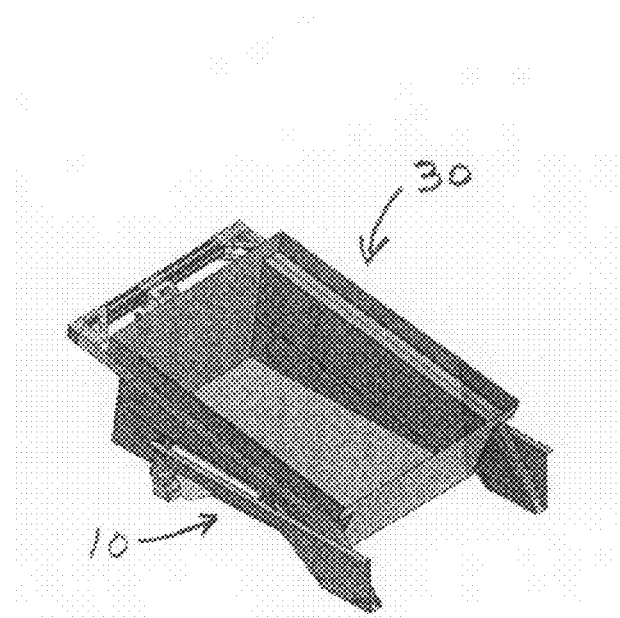
FIGS. 2a through 2d show a lift in combination with a dump box in various operating positions.

Referring to the drawing figures, FIGS. 1a through 1f show a lift hoist or crane unit 10.

The various components are numbered in FIG. 1c as follows:

a pair of arms 11 and 12 are connected by a cross-arm indicated at numeral 14;

the lower ends of arms 11 and 12 have angled rocker elements 17 and 18;

numerals 21 and 22 indicate lower support and drive elements;

the ends of the drive elements are shown at numerals 23 and 24 as angled to receive the angled upper rocker elements;

a winch unit is shown at numeral 16.

The winch unit 16 is utilized to pick up a load 29 as indicated in FIG. 1f.

As indicated in the progression of FIGS. 1a through 1f, the upper arms 11,12 and the cross member 14 are driven through various angles from zero degrees in FIG. 1a to about 135 degrees in FIG. 1f.

Referring to the drawing FIGS. 2a through 2d, it is seen that a dump box 30, having a generally rectangular shape, has been added to the lower lift or hoist unit 10.

Figure 2B:
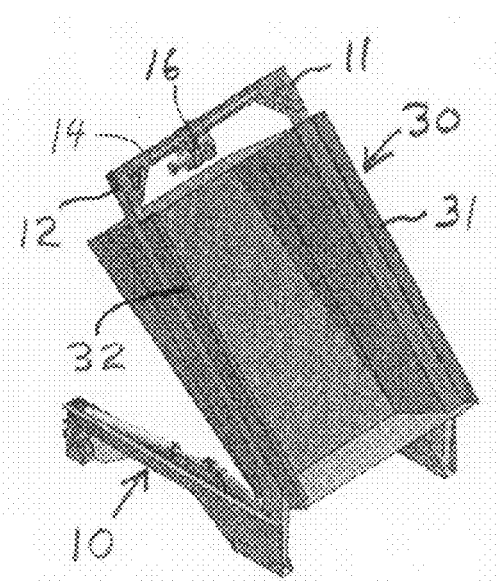
Figure 2C:
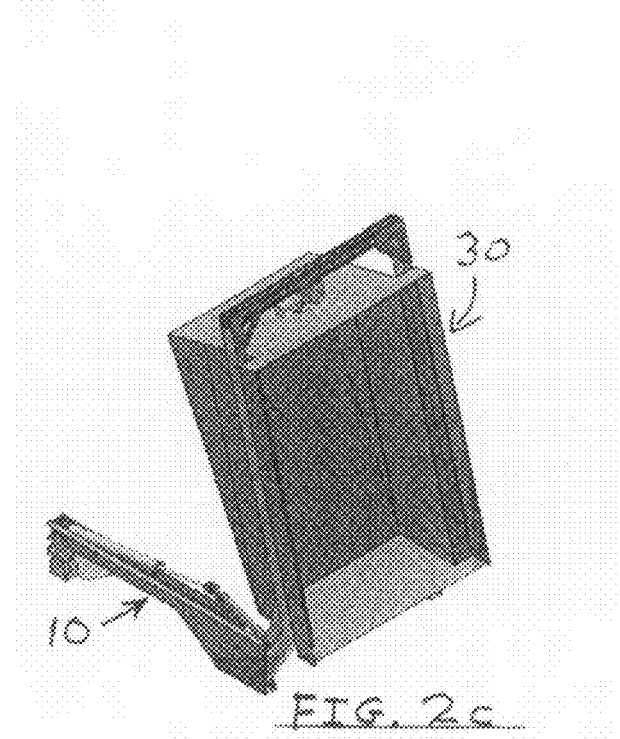
Figure 2D:
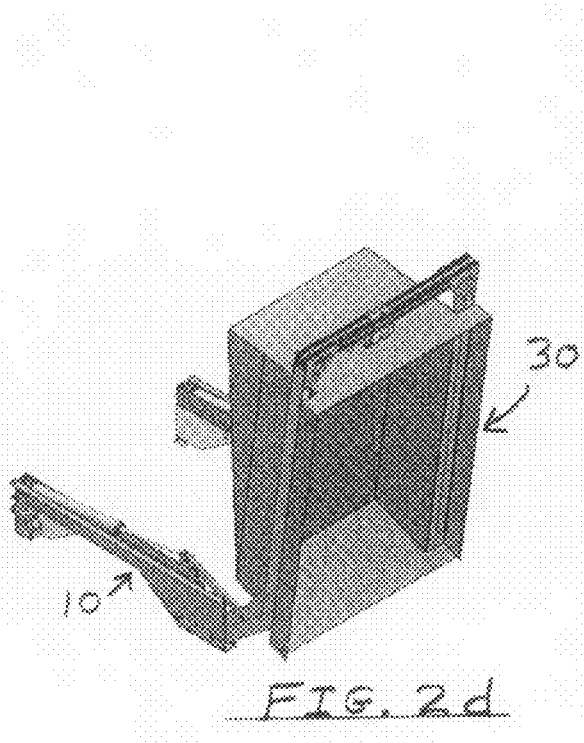

The progression of the combined moving hoist arms and the dump box from a lower position in FIG. 2a to a dumping position in FIG. 2d is indicated.

As shown in FIG. 2b, the dump box 30 has upper side rails 31 and 32 which are mounted to the lift or hoist arms 11 and 12 respectively.

As further indicated in FIG. 2b, the top end of the dump box 30 extends to a position short of the winch 16 location.

As will be further described, the winch 16 is utilized to pull the dump box onto the lift or hoist unit as a part of the overall assembly process.

The winch thus serves the dual purposes of carrying a load 29 and loading a dump box 30 onto the lift when desired.

Figure 3:
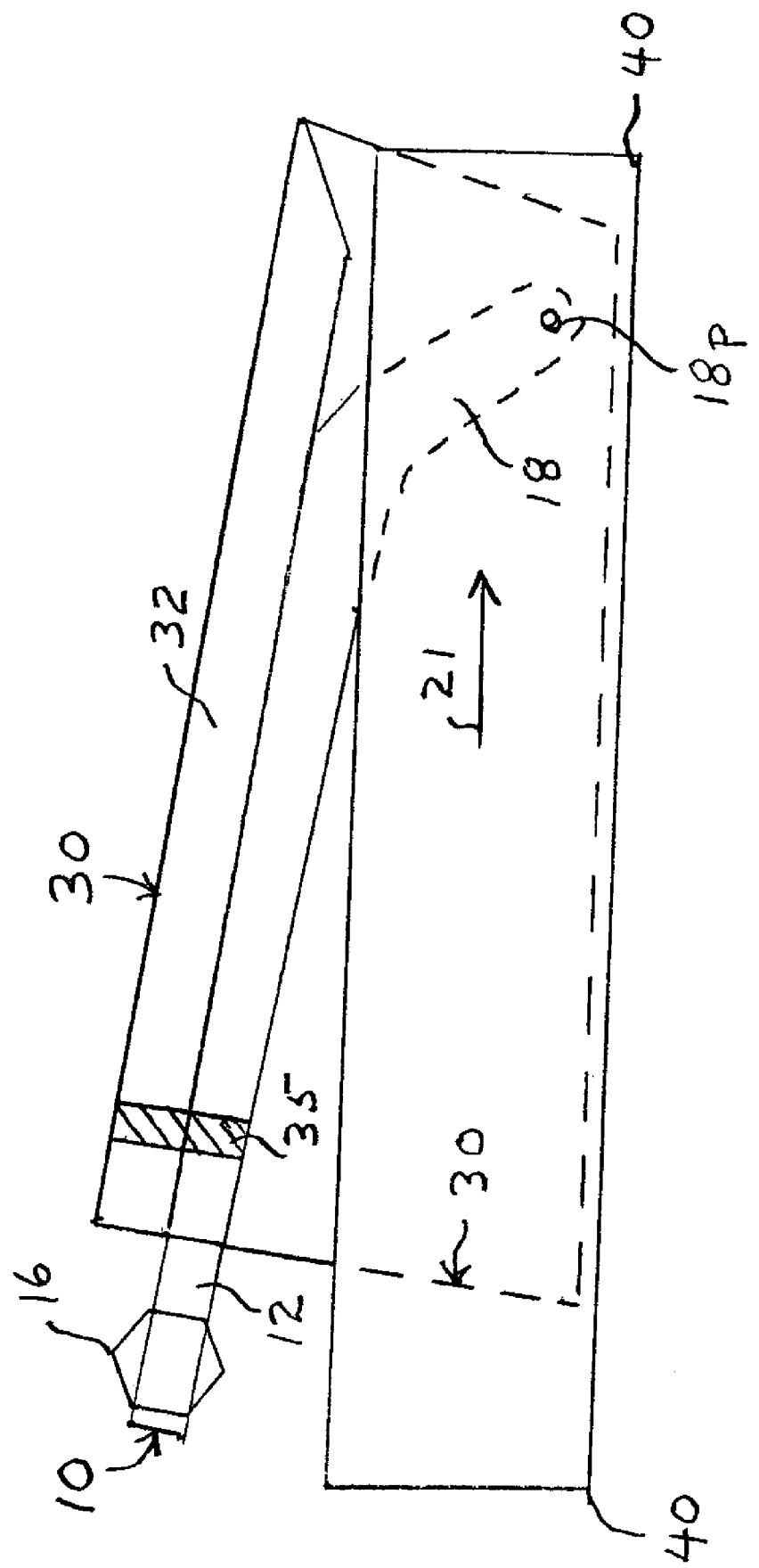
FIG. 3 shows a side schematic view of the lift and dump box in a down position as placed in a truck bed.

Referring to the drawing FIG. 3, showing a left side view, the combined hoist or lift 10 and the dump box 30 are shown as placed in a truck bed 40.

The truck bed 40 may be that of a standard pickup truck bed size or of a short bed size. The sizing of the lift or hoist may be varied to accommodate various truck bed sizes. Such variation may be achieved via telescoping elements on the hoist or lift unit.

As further shown in FIG. 3, the side rail 32 of the dump box is mounted to the hoist arm 12 by attaching element 35 comprising a bolt, clamp or other equivalent attaching means.

The lower end of arm 12 is curved as shown at numeral 18 and pivots about a point 18p as shown.

As indicated schematically in FIG. 3, the drive for the moving arm 12 comprises hydraulic means 21 as previously described.

The winch element 16 is shown in FIG. 3 as being above the dump box in this embodiment.

Figure 4:
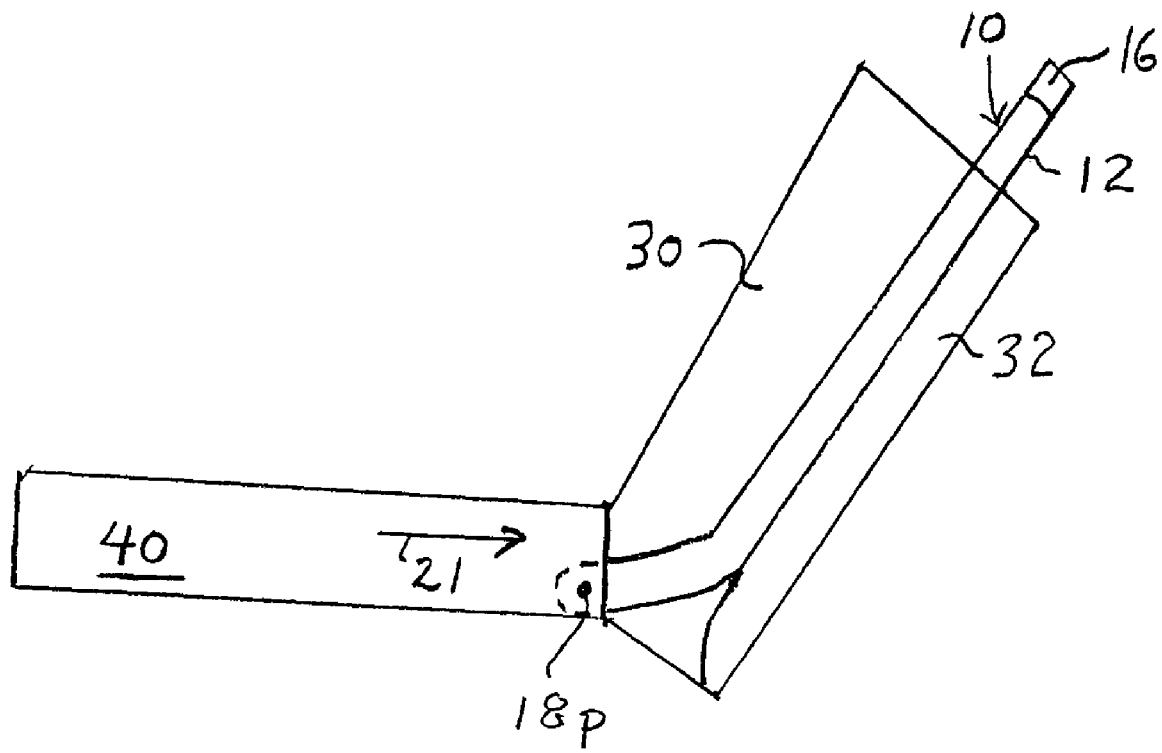
FIG. 4 is a side schematic view of the combined lift and dump box in a load dumping position.

As shown in the side schematic view of FIG. 4, the combined dump box 30 and lift 10 are moved to a dumping position.

As will be further described, such enables the truck bed 40 to transport and dump various loads such as top soil, sand, gravel etc.

Figure 5:
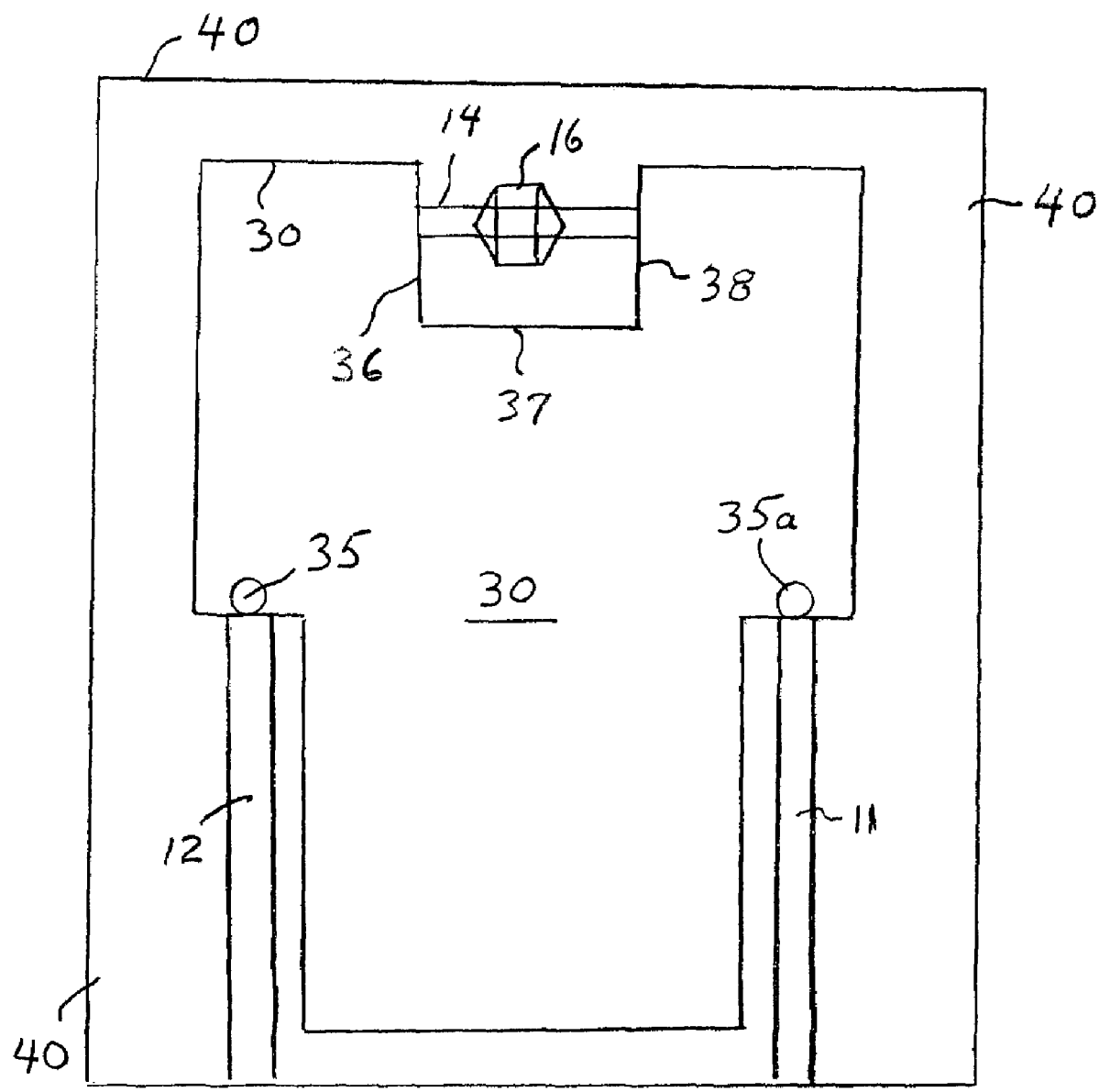
FIG. 5 is a top view of a dump box as positioned in a truck bed. This embodiment shows a differently shaped dump box designed to carry an increased volume of load such as top soil.

Referring to the top view of FIG. 5, showing a differing embodiment regarding the shape of the dump box 30, the lower truck bed is indicated schematically at numeral 40.

The movable lift arms 11 and 12 are also shown as supporting the dump box 30. Numerals 35 and 35a indicate schematically connection means of a type used in the mechanical arts.

The winch 16 is also shown in FIG. 5.

In this embodiment, the dump box is extended past the winch via cut out portions 36-38. Such enables access to the winch while providing a larger dump box volume for transport of more product.

Figure 6:
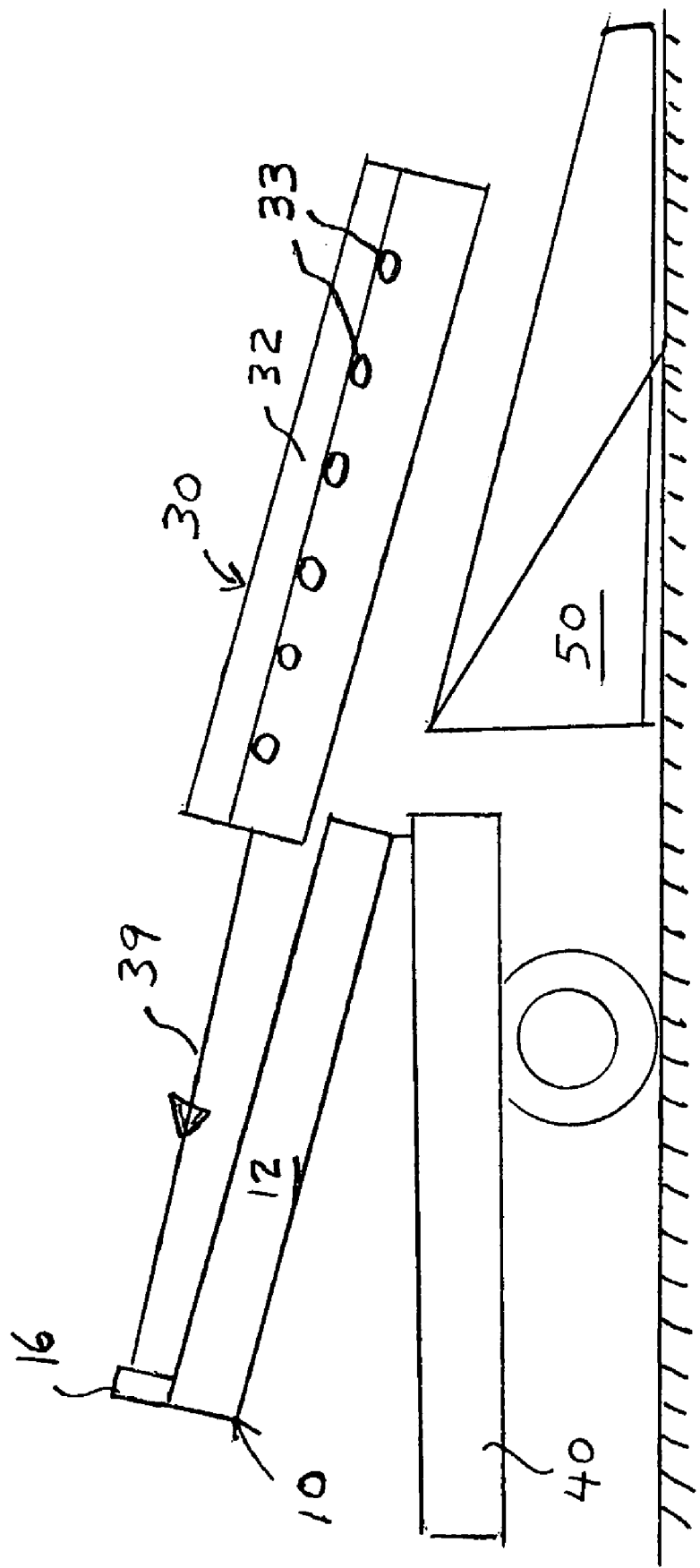
FIG. 6 shows, in schematic form, the method of attaching the dump box to the top portion of a lift, crane or hoist.

Referring to the schematic drawing of FIG. 6, it is important to note that the lift or hoist 10 may be used by itself with a truck bed 40 or in combination with a dump box 30.

The dump box 30 may be added to the system by attaching line 39 between the winch 16 and the dump box. A standard ramp 50 may be utilized to aid the loading process.

Rollers 33 may be placed under the dump box side rail 32 to further assist in the loading process.

The dump box may be unloaded or disconnected from the system in a similar easy manner.

A typical method of utilizing the combined features of the invention would involve the following steps: transport of new trees to an area to be landscaped; unloading the new trees and loading debris to be removed; transporting the debris to a site and unloading it; adding the dump box 30 to the lift and truck bed system; loading top soil into the dump box and transporting it to the area to be landscaped.

FIG. 7 schematically illustrates the method steps enabled by the invention as follows:
a) new trees 61 and 62 are transported to area 80 to be landscaped with area 80 having debris items 71 and 72 to be removed;
b) new trees 61 and 62 are lifted onto area 80 via lift 10; debris items 71 and 72 are lifted onto the truck bed 40;
c) debris items are transported to site 85 and unloaded;
d) the dump box 30 is added to the system and loaded with, for example, top soil;
e) the top soil is transported to the area to be landscaped and unloaded via the dump box.

Thus, multiple functions such as lifting landscaping items and delivering product such as top soil can be achieved by using a single truck or vehicle.

Also important is the fact that such multiple functions can be achieved by a single operating person thus reducing overall landscaping costs and thereby enabling more trees to be planted.

It is intended to cover equivalent methods of use and systems which would reasonably occur to those of skill in the art.

The invention is further defined by the claims appended hereto.

I claim:

1. A method of landscaping a particular area (80) comprising the steps of:
transporting new trees (61,62) to an area (80) to be landscaped by means comprising a truck bed (40) and a lift (10),
b) lifting the new trees (61,62) onto the area (80),
c) lifting debris items (71,72) from the area to be landscaped onto the truck bed (40) by means of the lift (10),
d) transporting the debris items (71,72) to a second area (85) and unloading them from the truck bed (40) by means of the lift (10),
e) adding a dump box (30) to the combined truck bed (40) and lift (10) combination,
f) loading the dump box (30) with top soil and transporting it to the area (80) to be land-scaped,
g) unloading the top soil onto the area to be landscaped (80) in an area adjacent to the new trees (61,62),
h) providing that the dump box (30) has significantly upwardly extending side wall means for transporting top soil with railing means (31,32) formed on the sides thereof for mounting to the lift (10),
i) providing that during the steps when the dump box (30) is not in use, it is completely separate from and not attached to the combined lift (10) and truck bed (40) structure,
j) providing that the dump box rails (31,32) have have roller means (33) fixedly placed thereunder and not being extendable to another point,
k) providing that a ramp (50) is utilized in the loading and/or unloading of the dump box (30) from the combined truck bed (40) and lift (10) system.

* * * * *